UNITED STATES PATENT OFFICE.

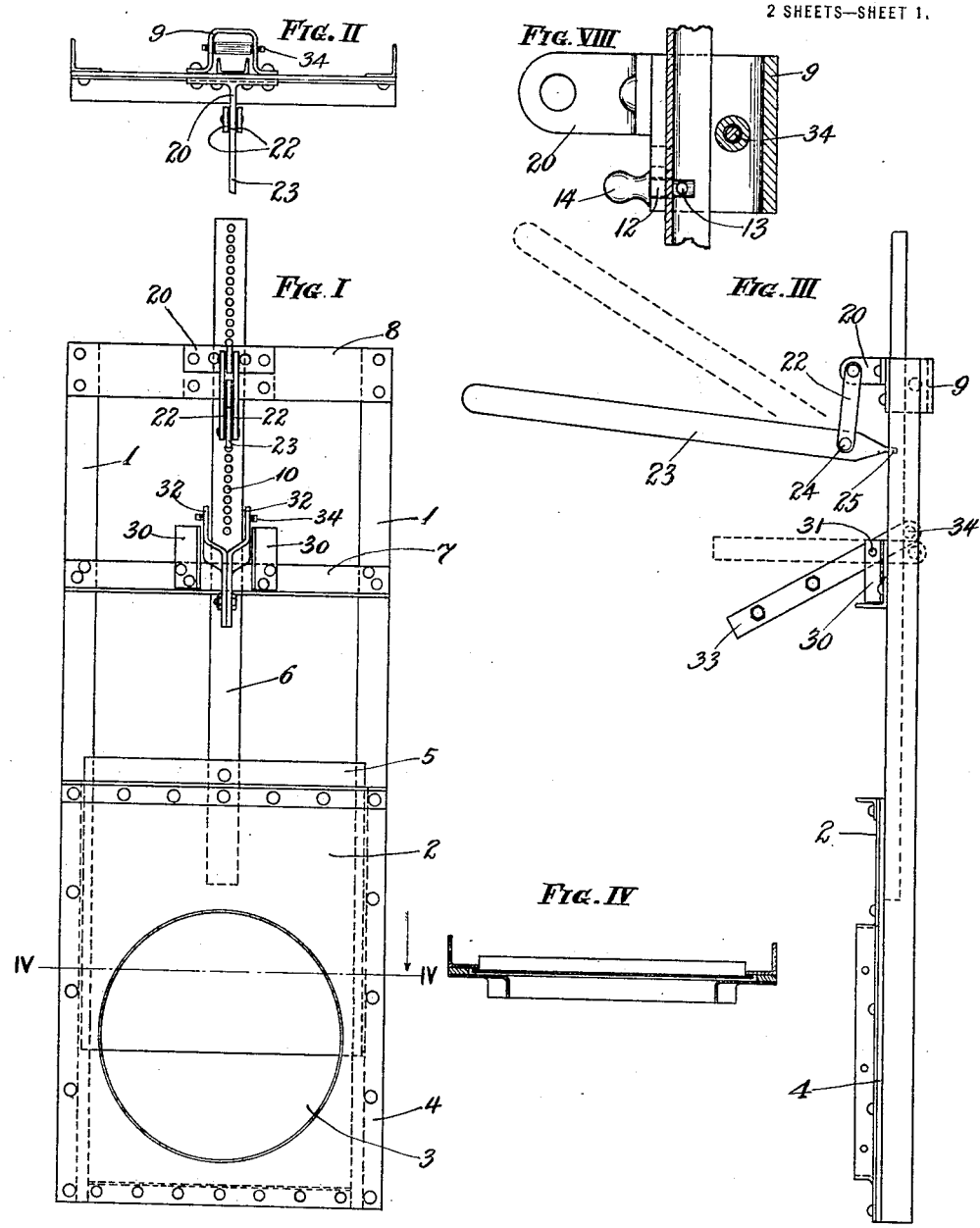

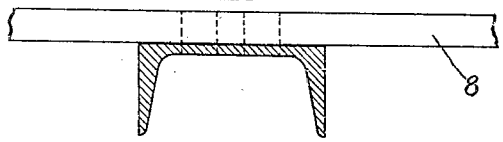
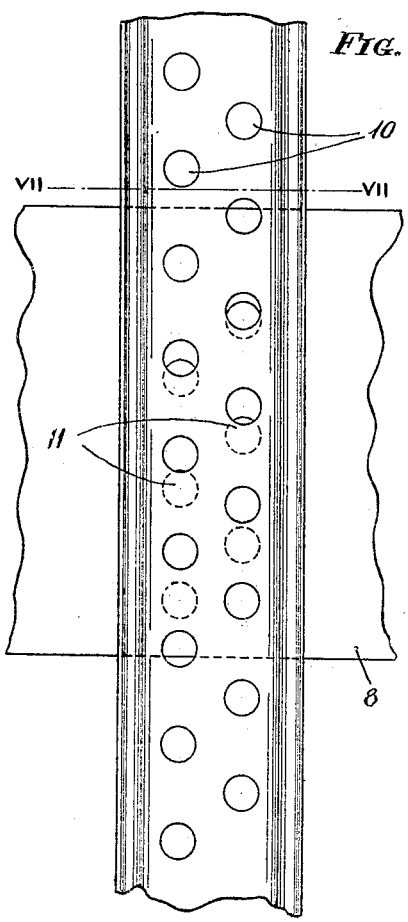
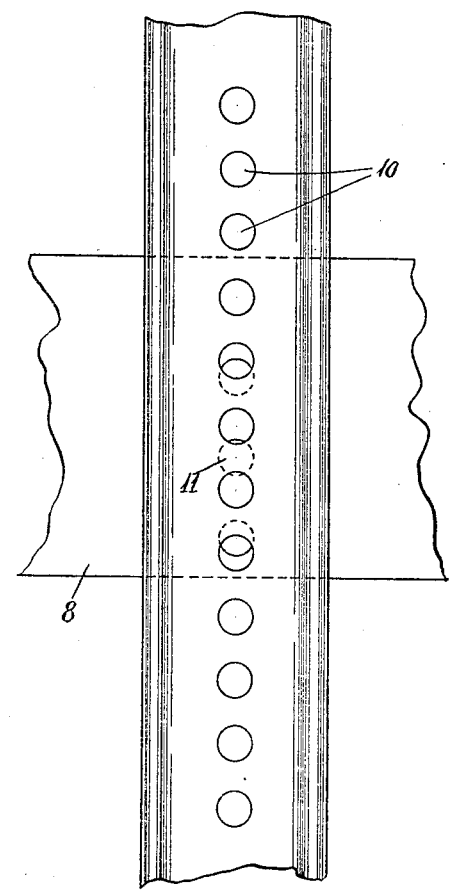

NORMAN V. FITTS, OF DENVER, COLORADO.

WATER-GATE.

1,272,933.   Specification of Letters Patent.   Patented July 16, 1918.

Application filed March 21, 1917. Serial No. 156,361.

*To all whom it may concern:*

Be it known that I, NORMAN V. FITTS, a citizen of the United States, residing at Denver, in the county of Denver and State of Colorado, have invented certain new and useful Improvements in Water-Gates; and I do hereby declare the following to be a full, clear, and exact description of the invention, such as will enable others skilled in the art to which it appertains to make and use the same.

This invention relates to hydraulic engineering, and more especially to sliding water gates; and the object of the same is to produce means for adjusting the height of such a gate by mechanism other than the usual rack and pinion, or screw, or other types of elements which so frequently become rusted and stuck after being left for some time exposed to the elements. These gates are used in flumes or ditches, and from time to time they are raised or lowered to increase or decrease and in some instances to cut off entirely the flow of water, from which it will be seen that they must have sufficient size and strength to withstand considerable pressure. Ordinarily they are made of suitable metal to prevent rotting and to give the necessary strength, and, as they are out of doors, provision must be made to guard against the parts rusting together, to render it possible for the operator to move a heavy gate even though it may be stuck, and to lock the gate in its adjusted position when desired.

A further important object of this invention is the provision of means enabling fine adjustment of gates of this type in any one of a number of positions differing by but a relatively small distance as to the gate aperture, and thus securing an accurate and close control of flow of water from a main ditch to consumers therealong. In the accomplishment of this object I employ a device providing for the relative adjustment of the gate, comprising selective means having provision for the locking of the gate in any of numerous fine adjustments.

These objects are carried out by the present invention which consists mainly in adjusting mechanism whereby the gate is raised and lowered by impulses of a lever and is held between impulses by a clutch or suitable brake mechanism actuated by a lever or otherwise, thus enabling the operator to stand and have the free use of both hands if desired on the adjusting lever. Details will be found below, reference being had to the drawings wherein:

Figure I is a side elevation of the entire gate, viewed from down-stream, Fig. II is a top plan view, Fig. III is a right edge view, and Fig. IV is a horizontal section on the line IV—IV of Fig. I.

Fig. V is an enlarged elevation of a fragment of the stem, and a portion of the upper cross bar, Fig. VI is a similar view illustrating a slight modification, and Fig. VII is a cross section on the line VII—VII of Fig. VI.

Fig. VIII is a detail of the locking pin.

Two uprights 1, preferably of angle iron and suitably spaced, are connected at their lower ends by a face plate 2 having an aperture 3 in it for the flow of water, and in upright guides 4 extending alongside this aperture is slidably mounted the gate proper, 5, the same by preference being of sheet metal, as best seen in Fig. IV. This, the lower end of the structure, is intended to be submerged in the flume or ditch along which the water flows, and when the gate is raised to a sufficient height the water passes uninterruptedly through the aperture, while its flow may be decreased or checked by lowering the gate as will be clearly understood. Secured to and rising from the gate is a bar which is preferably of channel iron and which I have termed the stem 6, the same passing in rear of a cross bar 7 connecting the uprights at a suitable point below their upper ends, and in rear of another cross bar 8 connecting their upper ends, and behind this bar the stem passes through a guide 9 best illustrated in Fig. II. This stem 6 is pierced with a row of holes 10 pitched at equal intervals therealong, and it may be a single row as seen in Fig. V or a double row of holes disposed in staggered relation to each other as seen in Fig. VI, or there might be more than two rows. The cross bar 8 is provided with a row of holes 11 alining with those numbered 10 but a little differently spaced, as seen in dotted lines in Fig. V, and in the modification illustrated in Fig. VI there will be plural rows as shown in dotted lines therein.

In the distribution of water through irrigation systems in which this gate is particularly practicable, it is very desirable and extremely important that means be provided for the very fine adjustment of the gate controlling the flow of water from the main canal or ditch into the laterals, and in the present invention this fine control or provision for close adjustment of the gate is provided by forming the apertures 10 in the stem at uniform pitch throughout the length of the stem and in forming the apertures 11 in the cross bar 8 at uniform pitch but different from the pitch of the pin holes 10 in the valve stem 6. Preferably the pitch of the pin holes 10 in the stem is greater than the pitch of the pin holes 11, so that by the movement of the stem upwardly a distance less than the length of its own pitch, one of the holes 10 may be brought into registration with an aperture 11 in the member 8. In order to provide for a very large range of fine adjustments the form of the stem shown in Fig. VI illustrates a multiplicity of rows of apertures in the plate and stem, these rows having their apertures relatively staggered and thereby dividing the distance into one-half through which the stem must be moved upwardly or downwardly to bring apertures in the stem and plate into registration than would be the case where only a single row of apertures is provided, as in Fig. V. From this it will be seen that if the arrangement and pitch of the apertures in the plate 8, Fig. V, be such that an upward movement of a half of an inch would bring one of the apertures 10 into alinement with one of the apertures 11 in the plate, that by providing two rows of apertures in the plate and stem, as in Fig. VI, this difference might be divided into one-half so that the stem need be lifted only one quarter of an inch, or, again, if the pitch of the apertures in Fig. V be such as to require an upward lift of a quarter of an inch in the single row, then in the double row, by the equal staggering of the rows of apertures in the plate 8, the stem need be lifted only one-eighth of an inch to achieve the requisite adjustment. From this it will be seen that I provide a selective means permitting the very fine and careful adjustment of the gate in accordance with the practice of this type of article in irrigation systems.

After the stem has been raised or lowered to adjust the position of the gate with respect to the aperture in the face plate, a locking pin 12 is passed through one of the holes 10 which will then register with one of the holes 11, and owing to the different spacing of the holes in the two rows there will almost always be registry at some point. This pin may have an eye 13 near that extremity opposite its head or handle 14, so that a padlock or other fastening device may be passed through the eye to prevent the removal of the pin by unauthorized persons.

Carried by the upper cross bar 8 is a bracket 20 of T-shape as best seen in Fig. II, its stem projecting forward as seen in Fig. III, and pivoted at 21 to the end of said stem in a pair of links 22 which hang astride a hand lever 23 to which also they are pivoted at 24—all pivots being rather loose. The tip 25 of said lever is reduced as seen in Fig. III so that it may enter any of the holes 10, and the pivot 24 is so near said tip that the handle end of the lever is quite long and the leverage is therefore good.

Secured to and rising from the lower cross bar 7 are standards 30 between which at 31 is pivoted the forked inner end of a foot lever 33, its fork arms 32 passing astride the stem 6 behind which they are connected by a transverse bolt or pin 34 as best seen in Fig. III. The proportion of parts is such that when the lower end of the structure is sunk into the flume or ditch the cross bar 7 will stand above the water level and about on a line with the ground at either side of the ditch, whereas the cross bar 8 will be somewhat higher; therefore an operator who grasps the hand lever 23 for adjusting the device, may place his foot on the projecting portion of the foot lever 33 in a manner described below. Excepting for this fact I do not wish to be limited to the size and exact details of structure, and of course the gate is susceptible of use wherever it may be advantageously employed.

Fig. I shows the gate as partly open. Assuming now that it is desired to raise it so as to entirely expose the aperture 3, the operator swings the lever 23 to a position as seen in dotted lines in Fig. III where its tip 25 engages one of the holes 10, and bearing on the handle of this lever he lifts the weights of the gate and stem off the locking pin 12 and then removes such pin. Bearing down farther on the hand lever, he swings it around its pivot 24 and its tip causes the rise of the stem 6 and gate 5, the latter sliding in the guides 4. He then places his foot on the outer end of the foot lever 33 and tilts it to the full-lined position in Fig. III, when its bolt 34 engages behind the stem and presses the latter forward against the lower cross bar 7 with a force commensurate with the weight applied and the leverage produced. Holding his foot in that position to sustain the weight of the gate, he manipulates the hand lever 23 to insert its top 25 in another hole 10 lower down the stem, after which he bears on the forward end of the hand lever and releases pressure on the brake lever so as to repeat the operation and raise the gate another step; and this is continued until the gate is raised as high as desired. Holding it now with one hand, with the other he can insert the pin 12 through a hole 10 which registers with a hole 11. On the other hand, if it be desired to lower the gate, the operator has but to lift its weight off the pin and remove the latter as described above, then press on the foot lever 33 to apply the clamp which serves the function of a brake, and then by disengaging the hand lever from the holes and easing up on the brake he can permit the gate and stem to descend to the point desired, and reinsert the locking pin. The use of the padlock and eye 13 is obvious. These structures invariably become incrusted with mud and to an extent rusted in place, and the powerful leverage exerted by a hand lever 23 proportioned about as shown will permit the operator to overcome the sticking which such rusting produces. Attention is directed to the fact that the braking mechanism as a whole is located sufficiently far below the hand lever mechanism to permit the operator to put his foot on the lever 33 and leave both hands free to manipulate the lever 23 and locking mechanism. The entire absence of a rack and pinion or gear, and of any worm or wheel, is, in my opinion, of advantage in a structure which is exposed to the elements as is this one.

What I claim is:

1. In a device of the class described, a framework having an aperture at its lower portion and provided with a series of selective holes, a closure movable across said aperture, a stem on the closure and provided with a series of holes differently pitched from those in said framework, means for adjusting the stem and closure, and a locking device for passing through selected registering holes.

2. In a device of the class described, a framework having an aperture at its lower portion and provided with rows of staggered holes pitched equidistant, an element movable across said aperture, a stem on the element provided with rows of staggered holes alined with the respective rows but differently pitched, means selectively engageable with the holes in the stem for adjusting its position, and a locking device for passing through selected registering holes.

In testimony whereof I affix my signature.

NORMAN V. FITTS.

Copies of this patent may be obtained for five cents each, by addressing the "Commissioner of Patents, Washington, D. C."